Sept. 26, 1950 H. C. AXELSEN 2,523,936
WIRE STRIPPER
Filed Aug. 30, 1948 2 Sheets-Sheet 1
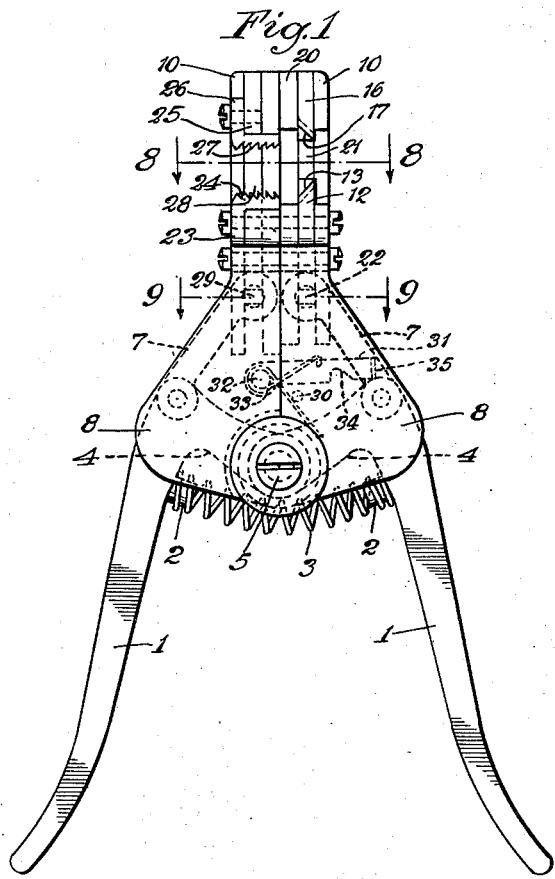
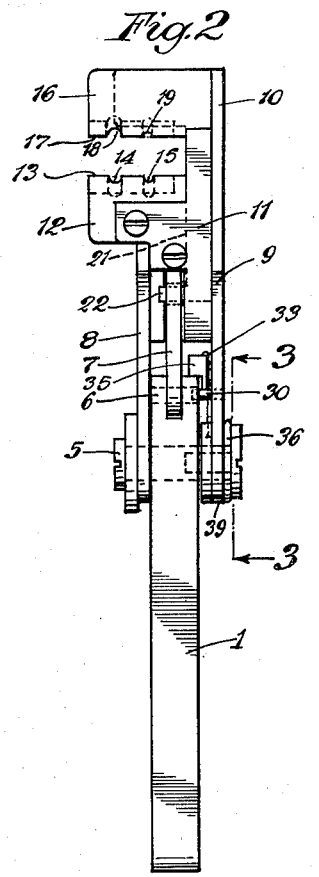
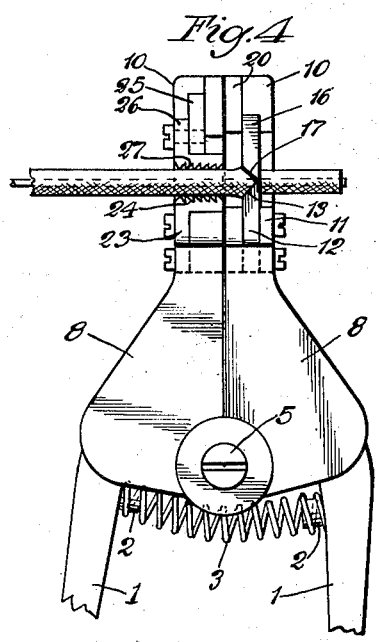
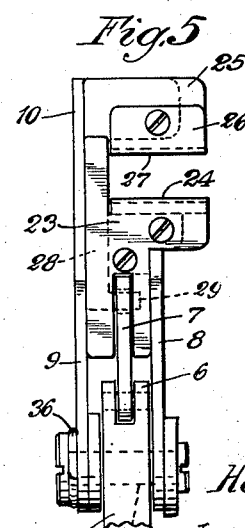
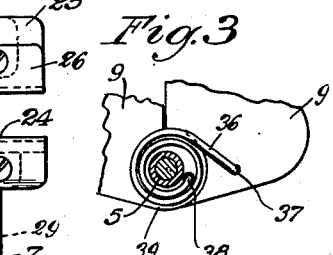
Inventor
Howard C. Axelsen
by Parker & Carter
Attorneys Sept. 26, 1950     H. C. AXELSEN     2,523,936
WIRE STRIPPER
Filed Aug. 30, 1948     2 Sheets-Sheet 2
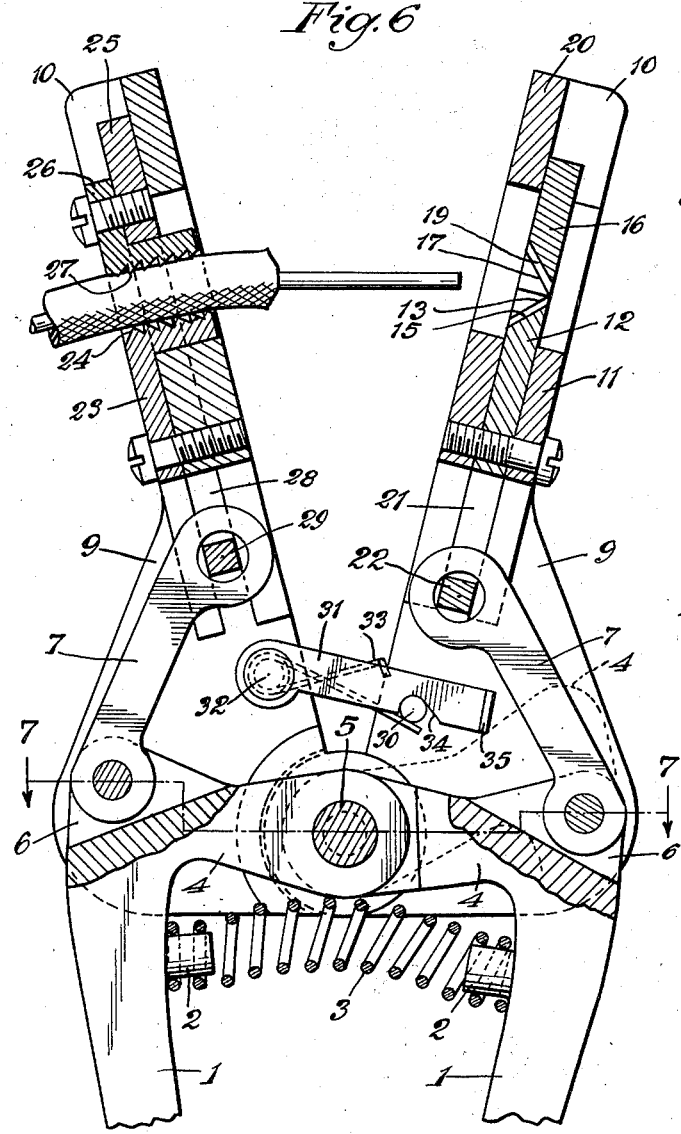
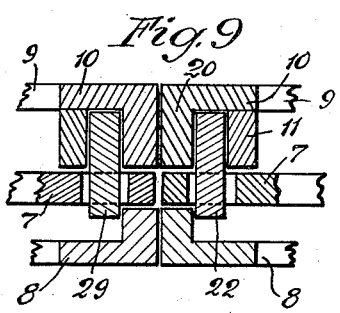
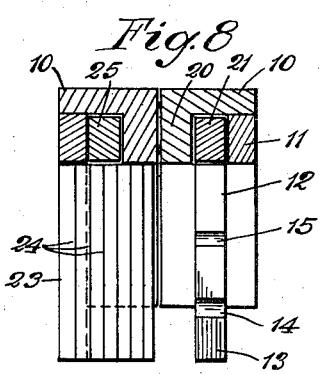
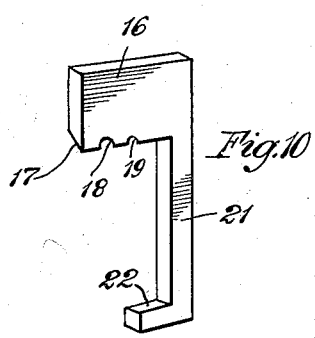
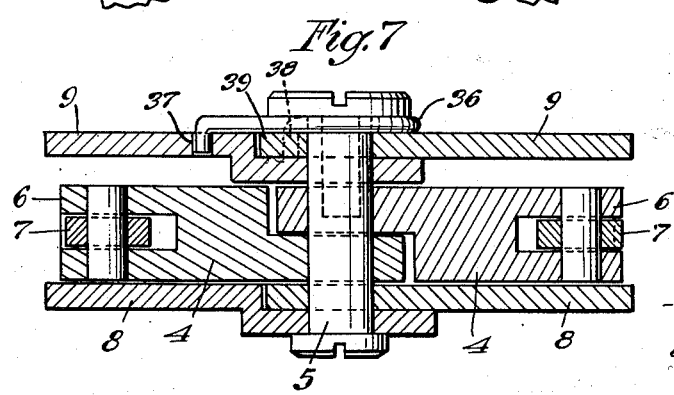
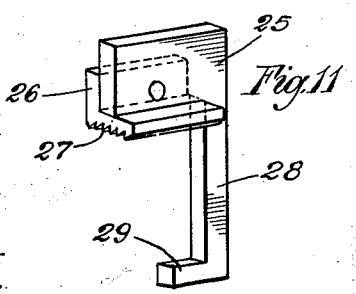
Inventor
Howard C. Axelsen
by Parker & Carter
Attorneys Patented Sept. 26, 1950

2,523,936

UNITED STATES PATENT OFFICE 2,523,936

WIRE STRIPPER

Howard C. Axelsen, Sycamore, Ill., assignor to Ideal Industries, Inc., Sycamore, Ill., a corporation of Delaware Application August 30, 1948, Serial No. 46,735

3 Claims. (Cl. 81—9.5)

This invention relates to a wire stripper and has for one object to provide a device which may be carried and used in the hand and by means of which the insulation may be stripped from a wire or a group or a cable.

It has for another object to provide a wire stripper so arranged that the insulation may be readily stripped at any desired distance or length.

Other objects will appear from time to time in the course of the specification and claims.

My invention is illustrated more or less diagrammatically in the accompanying drawings, wherein:

Figure 1 is a plan view of the device when not in use;

Figure 2 is a side elevation of the device of Figure 1;

Figure 3 is a sectional detail taken at line 3—3 of Figure 2;

Figure 4 is a plan view of a portion of the device in the position of use after the insulation has been severed and before it has been removed;

Figure 5 is a side elevation of the upper end of the device taken from the side opposite to that of Figure 2;

Figure 6 is a sectional view with parts omitted and parts broken away, illustrating the device in use after the insulation has been severed. This figure is on an enlarged scale;

Figure 7 is a section taken at line 7—7 of Figure 6;

Figure 8 is a section taken on an enlarged scale at line 8—8 of Figure 1 with parts omitted;

Figure 9 is a section taken on an enlarged scale at line 9—9 of Figure 1 with parts omitted;

Figure 10 is a perspective view of the movable cutter element removed from its support; and, Figure 11 is a perspective view of the movable gripping element removed from its support.

Like parts are indicated by like characters throughout the specification and drawings.

The device includes a pair of handle members 1, 1. Each may carry a boss 2 and opposite ends of a spring 3 are mounted on bosses 2. The spring is biased to hold the device in the position shown in Figures 1 and 4 in particular. The handle members are each provided with portions 4 which are pivoted together about a pivot 5. Each handle is provided with bifurcations 6 between which separating links 7, 7 are pivoted.

Pivoted also on pivot 5 are frame portions 8 and 9. These frame portions, as shown herewith, are made of separate plate members. They might be formed otherwise and the invention is not limited to a built-up frame part. The frame portions 9 are provided with upward extensions 10. Fixed between the frame portions 8 and 9 at one side is a cutter support 11. This support, as shown in Figure 2, is shaped to fit between the members 8 and 9 and to overlap the member 8 and to extend upwardly partially along the extension 10. A fixed cutter element 12 is mounted on the member 11 and is provided with a plate-like portion 13 which is inclined, as shown in Figure 4 and may have one or more notches 14 and 15 of different sizes formed in it. A movable cutter element 16 with a blade portion 17 and corresponding cutting notches or openings 18 and 19 is positioned to slide, with respect to the members 8 and 9, and is guided in part by the member 11. It is also guided by the member 20 which is fixed to the upward extension 10 of one of the frame portions 9. The moving cutter is provided with a downward extension 21 and a laterally extending member 22 which, as shown in Figure 6, fits within an eye formed in one of the links 7. Thus movement of the link in response to movement of the handle 1 raises and lowers the movable cutter.

Fixed between the opposite pairs of frame members 8 and 9 is a fixed gripping member 23 which is provided with a roughened upper surface 24.

Movably mounted between the frame members 8 and 9 which carry the fixed gripping member 23, is a movable part 25 upon which a gripping member 26 is fixed. This member is provided with a roughened surface 27. The member 25 is provided with a downward extension 28 and a lateral extension member 29 which, as shown in Figure 6, is received in an eye formed in one of the links 7 and thus the movable gripping member is raised and lowered in response to movement of the link. This latter movement is caused by movement of the handle 1.

The blade members of the gripping members are shown as separate from the parts which carry them. This is advantageous but not essential. They can be integral with parts that carry them that are made separately to permit adjustment or removement for repair, or for the insertion of new members in case of excessive wear.

As a guide for movement in the stripping direction, the following mechanism is provided: A pin 30 is formed on one of the members 9 and a latch 31 is pivoted at 32 on the opposite member 9. A spring 33 is associated with the pivot 32 and with the latch 31 and is biased to move the latch in a downward direction. The latch is notched at 34 which notch is positioned for engagement with the pin or stop 30. The latch 31 is also provided with a laterally bent part 35 which, as indicated in dotted lines in Figures 1 and 6, may contact the upper surface of the adjacent member 4.

If the device is in the inoperative position of Figure 1, the spring 3 moves the parts to the position shown in that figure and in that position, the member 35 contacts the upper part of the opposite member 4 and is raised from the position of Figure 6 to the position of Figure 1.

After a wire has been stripped by moving the handles 1 together and correspondingly separating the stripping and cutting parts and the handles 1 are allowed to separate under the influence of the spring 3, the cutting and gripping members move toward each other, the latch 31 is then moved into the position of Figure 6 and a brief "dwell" occurs during which the latch engages the pin 30. While the parts are in this position, the effect of the latch is to permit the gripping parts and the insulation cutting parts to move apart so that the wire may be removed from the device. After the "dwell," the parts are returned to the full inactive postition of Figure 1.

The spring 36 is engaged at 37 in one of the members 9 and at the other end, it is engaged at 38 in an extension 39 formed as a part of the opposite member 9. It is biased to move the parts 9 and the members 1 are attached to them and returned to the full inactive position of Figure 1.

It will be realized that whereas I have illustrated and described an operative device, still many changes might be made in the size, shape, number and disposition of parts without departing materially from the spirit of my invention. I wish, therefore, that my showing be taken as in a broad sense as diagrammatic rather than limiting me to the precise showing.

The use and operation of my invention are as follows:

When the device is inactive as shown in Figure 1 and it is to be used, a wire is put into it, as shown in Figure 4. The handles 1 are then drawn together compressing the spring 3. When the handles 1 are drawn together, the links 7 being pivoted to the parts 6 of the handles, are drawn downwardly and carry the movable gripping member 25 and the movable cutting member 16 downwardly. The wire will be adjusted to lie opposite a suitable notch 18 or 19. Ordinarily, the notch is somewhat larger than the diameter of the wire which is to lie within it. As the handles are progressively moved together, the gripping effect between the fixed and movable gripping members is increased, and at the same time, the fixed and movable cutting members are moved together sufficiently to cut the insulation. This is the position shown in Figure 4.

As the handle members are drawn further together, those parts which carry the gripping members and the severing members are separated as shown in Figure 6. Since the wire is gripped firmly between the members 23 and 25, and since the insulation has been severed by the members 12 and 16, the insulation is drawn off of the wire and is stripped from it, being pushed away by the flat sides of the cutting members 12 and 16.

The stripping operation is now complete and the handles are released and permitted to spread apart under the influence of the spring 3. After a certain amount of this movement, the parts have returned to the postion of Figure 6 and the latch 31 is engaged with the pin 30 and the brief "dwell" referred to above occurs. During this "dwell" the gripping members and the cutting members separate to the position of Figure 1 and the wire may be removed. Further separation of the handles 1 under the influence of the spring 3 carries the parts toward the position of Figure 1. The spring 36 assists in moving the parts fully to that position.

Movement of the right-hand handle 1, as shown in Figure 6 in particular, is effective to raise the portion 35 of the latch member 31 after a sufficient "dwell" has occurred to permit removal of the wire which has been stripped.

I claim:

1. In combination in an insulation stripping tool, a pair of frame members pivoted together, a pair of handles pivoted concentrically with the pivot of the frame members and operatively connected to the frame members for opening and closing the same, a fixed gripping means mounted on one of the frame members, a cooperating movable gripping means slidably mounted on said frame member, a fixed cutting means mounted on the other frame member and a cooperating movable cutting means slidably mounted on said other frame member, and means for cooperatively actuating the movable cutting means and the movable gripping means with respect to the stationary cutting means and to the stationary gripping means respectively, when the handles are pivotally moved comprising means connecting one of said handles to said movable gripping means and means connecting the other of said handles to said movable cutting means, cooperating latch members carried by said frame members and adapted to hold said frame members temporarily spaced apart when so moved by the handles, one of said latch members including latch release means positioned in the path of movement of one of said handles in its normal return movement from frame-open to frame-closed position to release said latch.

2. In combination in an insulating stripping tool, a pair of frame members pivoted together, a first resilient means urging the frame members to closed position, a pair of pivoted handle members operatively connected to the frame members for moving them to open position against the force of said resilient means, a second resilient means urging said handle members apart, a stationary gripping member carried by one of the frame members, a gripping member movably mounted in opposition to said stationary gripping member, a stationary cutting member carried by the other frame member, a cutting member movably mounted in opposition to the stationary cutting member, means operatively connecting the movable gripping member and the movable cutting member with the handle members for actuation thereby into cooperative relation with the stationary gripping member and the stationary cutting member respectively, cooperating latch members carried by the frame members for releasably holding the frame members in open position when so moved by the handle members, one of said latch members including a latch release part positioned in the path of movement of a handle member in moving from frame-open to frame-closed position, whereby to release the latch in the normal return movement of said handle member under the influence of said second mentioned resilient means.

3. In combination in an insulation stripping tool, a pair of pivoted frame members, first yielding means urging said frame members to closed position, a pair of pivoted handle members for moving the frame member to open position, means pivotally connecting said handle members and said frame members for relative pivotal movement, second yielding means urging said handle members apart, fixed gripping means mounted on one of said frame members, a cooperating movable gripping means mounted on said frame member, a fixed cutting means mounted on the other frame member, cooperating movable cutting means mounted on said other frame member, means for cooperatively actuating the movable gripping means and the movable cutting means with respect to the stationary gripping means and to the stationary cutting means, respectively, when the handle members are pivotally moved together against the force of said second yielding means, said actuating means comprising link means connecting said handle members to said movable gripping means and to said movable cutting means, cooperating latch members carried by the frame members and adapted to hold the frame members temporarily spaced apart against the force of said first yielding means when so moved by said handle members, means yieldingly urging the latch member into latching position, one of said latch members including latch release means lying in the path of movement of a handle member in moving from frame open to frame-closed position whereby the latch is released in the normal return movement of the handle member under the force of said second yielding means tending to urge the handles apart.

HOWARD C. AXELSEN.

REFERENCES CITED

The following references are of record in the file of this patent:

UNITED STATES PATENTS

| Number | Name | Date |
| --- | --- | --- |
| 1,151,319 | Wood | Aug. 24, 1915 |
| 2,179,581 | Voogd | Nov. 14, 1939 |
| 2,313,793 | Wood | Mar. 16, 1943 |